United States Patent
Toyota et al.

(10) Patent No.: US 10,400,824 B2
(45) Date of Patent: Sep. 3, 2019

(54) OIL SEAL STRUCTURE AND TURBOCHARGER

(71) Applicant: IHI Corporation, Koto-ku (JP)

(72) Inventors: Takahisa Toyota, Tokyo (JP); Tatsumi Inomata, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/839,934

(22) Filed: Dec. 13, 2017

(65) Prior Publication Data
US 2018/0100545 A1    Apr. 12, 2018

Related U.S. Application Data

(63) Continuation of application No. PCT/JP2016/070870, filed on Jul. 14, 2016.

(30) Foreign Application Priority Data

Jul. 22, 2015 (JP) ................................. 2015-144745

(51) Int. Cl.
*F16C 33/76* (2006.01)
*F02B 39/14* (2006.01)
*F01D 25/16* (2006.01)
*F01D 25/18* (2006.01)
*F16C 19/16* (2006.01)
(Continued)

(52) U.S. Cl.
CPC .......... *F16C 33/762* (2013.01); *F01D 25/164* (2013.01); *F01D 25/183* (2013.01);
(Continued)

(58) Field of Classification Search
CPC .............................. F16C 27/045; F01D 25/183
See application file for complete search history.

(56) References Cited

U.S. PATENT DOCUMENTS 4,664,605 A * 5/1987 Asano .................. F01D 25/183
                                                       417/407
8,474,433 B2 * 7/2013 French .................... F01D 25/16
                                                       123/320
(Continued)

FOREIGN PATENT DOCUMENTS

CN         1928335 A      3/2007
CN       1011008345 B    10/2011
(Continued)

OTHER PUBLICATIONS

International Search Report dated Oct. 4, 2016 in PCT/JP2016/070870 filed Jul. 14, 2016 (with English Translation).
(Continued)

*Primary Examiner* — Thomas R Hannon
(74) *Attorney, Agent, or Firm* — Oblon, McClelland, Maier & Neustadt, L.L.P.

(57) ABSTRACT

An oil seal structure includes: a bearing unit for a shaft, being provided in a housing hole of a bearing housing; a damper positioned outside the bearing unit in a radial direction of the shaft to absorb vibration of the shaft; a seal body portion facing the damper through a gap in an axial direction of the shaft; a partition wall positioned between the damper and the seal body portion to divide the gap into a first space on the damper side and a second space on the seal body portion side; and a guide portion provided in the partition wall to be closer to an oil drain port than the shaft and having: an inner side in the radial direction of the shaft, being positioned on the first space side; and an outer side in the radial direction of the shaft, being positioned on the second space side.

11 Claims, 4 Drawing Sheets

(51) Int. Cl.
  *F16C 33/66* (2006.01)
  *F16C 33/78* (2006.01)
  *F16C 19/52* (2006.01)
  *F16C 27/00* (2006.01)
  *F16C 19/54* (2006.01)

(52) U.S. Cl.
  CPC .............. *F02B 39/14* (2013.01); *F16C 19/16* (2013.01); *F16C 19/527* (2013.01); *F16C 27/00* (2013.01); *F16C 33/6685* (2013.01); *F16C 33/768* (2013.01); *F16C 33/7816* (2013.01); *F16C 33/7886* (2013.01); *F05D 2220/40* (2013.01); *F05D 2240/60* (2013.01); *F16C 19/163* (2013.01); *F16C 19/548* (2013.01); *F16C 2360/24* (2013.01)

(56) References Cited

U.S. PATENT DOCUMENTS

| | | | |
|---|---|---|---|
| 9,784,315 B2 * | 10/2017 | Koda | F01D 25/16 |
| 2007/0059188 A1 * | 3/2007 | Fraser | F01D 25/183 |
| | | | 417/407 |
| 2010/0218499 A1 | 9/2010 | Shibui et al. | |

FOREIGN PATENT DOCUMENTS

| | | |
|---|---|---|
| EP | 1 762 713 A2 | 3/2007 |
| JP | 61-107933 U | 7/1986 |
| JP | 03-106135 U | 11/1991 |
| JP | 2007-321698 | 12/2007 |
| JP | 2008-031949 | 2/2008 |
| JP | 2010-096119 | 4/2010 |
| JP | 2011-220273 | 11/2011 |
| JP | 2012-036855 | 2/2012 |
| JP | 2013-177900 | 9/2013 |
| JP | 2015-034471 | 2/2015 |
| JP | 2015-081542 | 4/2015 |
| KR | 10-2007-0078375 A | 7/2007 |
| WO | WO 2015/060304 A1 | 4/2015 |

OTHER PUBLICATIONS

Written Opinion dated Oct. 4, 2016 in PCT/JP2016/070870 filed Jul. 14, 2016.

Chinese Office Action issued in Chinese Patent Application No. 201680032128.3 dated Apr. 22, 2019, citing references AO-AR therein.

* cited by examiner

OIL SEAL STRUCTURE AND TURBOCHARGER

CROSS REFERENCE TO RELATED APPLICATIONS

This application is a continuation application of International Application No. PCT/JP2016/070870, filed on Jul. 14, 2016, which claims priority to Japanese Patent Application No. 2015-144745, filed on Jul. 22, 2015, the entire contents of which are incorporated by reference herein.

BACKGROUND

1. Technical Field

The present disclosure relates to an oil seal structure provided with a damper for reducing vibration of a shaft, and to a turbocharger.

2. Description of the Related Art

Conventionally, there has been known a turbocharger in which a shaft provided with a turbine wheel at one end and a compressor wheel at the other end is rotatably supported in a bearing housing. The turbocharger as described above is connected to an engine, so that the turbine wheel is rotated by exhaust gas discharged from the engine to cause the compressor wheel to rotate with rotation of the turbine wheel through the shaft. In this way, the turbocharger compresses air with rotation of the compressor wheel, and delivers the air to the engine.

Japanese Patent Laid-Open Publication No. 2012-36855 (Patent Literature 1) discloses a turbocharger using a rolling bearing. The turbocharger includes a bearing housing provided with a housing hole. The housing hole houses a cylindrical damper member, and the rolling bearing is provided inside the damper member. The rolling bearing rotatably supports a shaft coupling a turbine wheel and a compressor wheel to each other. Between the housing hole and the compressor wheel, an oil seal unit is provided. The oil seal unit axially separates from the housing hole. Between the oil seal unit and the housing hole (rolling bearing), a partition is provided. Note that the shaft extends through the oil seal unit and the partition. The partition divides a space between the oil seal unit and the housing hole (rolling bearing) into two spaces aligned in the axial direction. Lubricant flowing out from the housing hole flows into the two spaces divided by the partition, and then is discharged vertically downward from each of the spaces. As a result, the lubricant is prevented from leaking to the compressor wheel side from the oil seal unit.

SUMMARY

In the structure of Patent Literature 1, lubricant is discharged vertically downward from the two spaces divided by the partition, and is merged in a space vertically below the partition. The space (referred to as a first space) between the housing hole and the partition is closer to the housing hole than the space (referred to as a second space) between the partition and the oil seal unit. Thus, when the lubricant discharged from both of the damper member and the rolling bearing is merged in the first section, a flow of the lubricant may stagnate depending on operating conditions. This stagnant flow becomes a cause of suppressing improvement in oil draining property, so that development of a technique to further improve oil draining property is required.

It is an object of the present disclosure to provide an oil seal structure and a turbocharger, capable of improving oil draining property.

A first aspect of the present disclosure is an oil seal structure including: a housing provided with a housing hole; a bearing unit for a shaft, being provided in the housing hole; at least one damper positioned outside the bearing unit in a radial direction of the shaft, configured to absorb vibration of the shaft while holding lubricant between an inner wall of the housing hole and the damper; a seal body portion facing the damper through a gap in an axial direction of the shaft; a partition wall dividing the gap formed between the damper and the seal body portion into a first oil drain space on the damper side and a second oil drain space on the seal body portion side; an oil drain port formed in the housing, configured to communicate with an outside of the housing from the first oil drain space and the second oil drain space; and a guide portion provided in the partition wall to be closer to the oil drain port than the shaft and having an inner side in the radial direction of the shaft to be positioned on the first oil drain space side and an outer side in the radial direction of the shaft to be positioned on the second oil drain space side.

The oil seal structure may further include a vibration absorbing member including a body to be housed in the housing hole and having the damper formed on an outer peripheral surface of the body. The body of the vibration absorbing member may be provided with a projecting portion that faces the partition wall in the axial direction of the shaft and projects from the housing hole. The guide portion may extend to a position facing the projecting portion outside in the radial direction of the shaft.

The damper may include an annular protrusion that protrudes radially outward from the body of the vibration absorbing member. In the housing, an oil drain hole may be formed that penetrates from the oil drain port side to the housing hole. An opening of the oil drain hole on the housing hole side may face the damper.

The at least one damper may include a plurality of the annular protrusions separated from each other in the axial direction of the shaft. The oil drain hole may have the opening positioned among the plurality of the annular protrusions and extend from the opening toward the oil drain port.

The seal body portion may include an enlarged portion at a position facing the guide portion in the axial direction of the shaft, in the seal body portion, the enlarged portion inclining in a direction in which a passage cross-section of the second oil drain space expands toward the oil drain port side.

A cutout may be formed at a portion facing the guide portion in the axial direction of the shaft, on an end face of the housing at which the housing hole is opened, the cutout expanding a passage cross-section of the first oil drain space.

A plate groove recessed in the axial direction of the shaft may be formed on an inner wall surface facing the second oil drain space in the seal body portion.

A second aspect of the present disclosure is a turbocharger that includes the oil seal structure according to the first aspect.

According to the present disclosure, oil draining property can be improved.

DESCRIPTION OF THE EMBODIMENTS

Figure 1:
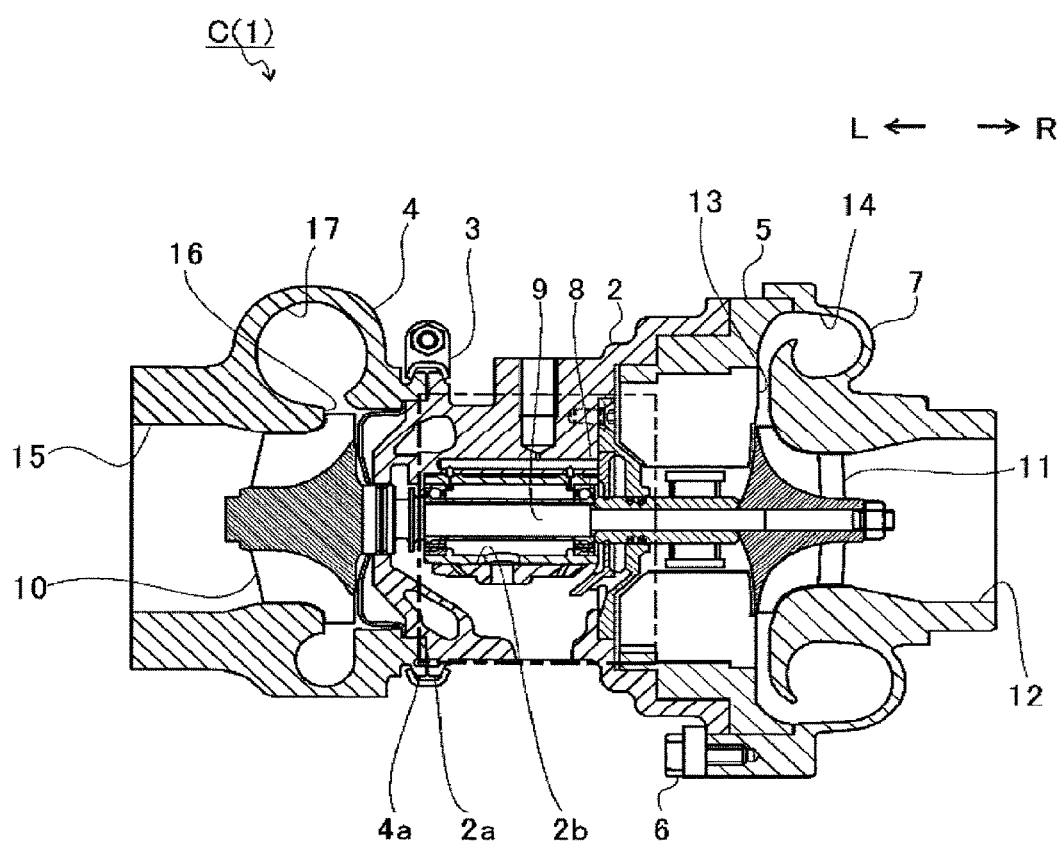
FIG. 1 is a schematic sectional view of a turbocharger.

With reference to accompanying drawings below, an embodiment of the present disclosure will be described in detail. Dimensions, material, other specific numeric values, and the like, shown in the embodiment are merely exemplification to facilitate understanding of the present disclosure, and thus do not limit the present disclosure. Note that, in the present description and the drawings, an element having a substantially identical function and structure is assigned the same reference character to eliminate a duplicated description.

FIG. 1 is a schematic sectional view of a turbocharger C. In the description below, a direction indicated by an arrow L illustrated in FIG. 1 is the left of the turbocharger C, and a direction indicated by an arrow R is the right of the turbocharger C. As illustrated in FIG. 1, the turbocharger C includes a turbocharger body 1. The turbocharger body 1 includes a bearing housing 2 (housing), a turbine housing 4 that is coupled to the left of the bearing housing 2 with a fastening mechanism 3, and a compressor housing 7 that is coupled to the right of the bearing housing 2 with a fastening bolt 6. These housings are integrated. Note that the turbocharger C includes an electric motor 5 provided between the bearing housing 2 and the compressor housing 7. The electric motor 5 includes components, such as a motor rotor, stator coil, and a housing, for example. FIG. 1 illustrates an internal structure of the electric motor 5 by simplifying the structure.

The bearing housing 2 has an outer peripheral surface near the turbine housing 4. The outer peripheral surface is provided with a protrusion 2a. The protrusion 2a protrudes in a radial direction of the bearing housing 2. The turbine housing 4 has an outer peripheral surface near the bearing housing 2. The outer peripheral surface is provided with a protrusion 4a. The protrusion 4a protrudes in a radial direction of the turbine housing 4. The bearing housing 2 and the turbine housing 4 are fixed to each other by fastening of the protrusions 2a and 4a with the fastening mechanism 3. For example, the fastening mechanism 3 is constituted by a G coupling that holds the protrusions 2a and 4a.

A housing hole 2b is formed in the bearing housing 2. The housing hole 2b penetrates the bearing housing 2 in a left-right direction of the turbocharger C. In the housing hole 2b, a rolling bearing (bearing unit) 8 is provided. The rolling bearing 8 rotatably supports a shaft 9. The shaft 9 has the left end fixed to a turbine wheel 10. The turbine wheel 10 is rotatably housed in the turbine housing 4. Further, the shaft 9 has the right end fixed to a compressor wheel 11. The compressor wheel 11 is rotatably housed in the compressor housing 7.

An intake port 12 is formed in the compressor housing 7. The intake port 12 opens on the right of the turbocharger C to be connected to an air cleaner (not illustrated). Further, in a state where the electric motor 5 and the compressor housing 7 are coupled to each other with the fastening bolt 6, mutually opposing faces of the electric motor 5 and the compressor housing 7 form a diffuser passage 13 which increases air pressure. The diffuser passage 13 is annularly formed from inward to outward in the radial direction of the shaft 9. Furthermore, the diffuser passage 13 communicates with the intake port 12 through the compressor wheel 11 inside in the radial direction.

The compressor housing 7 is provided with a compressor scroll passage 14. The compressor scroll passage 14 is annularly formed, and is positioned outside in the radial direction of the shaft 9 from the diffuser passage 13. The compressor scroll passage 14 communicates with not only an intake port (not illustrated) of an engine, but also the diffuser passage 13. Thus, when the compressor wheel 11 rotates, air is suctioned into the compressor housing 7 through the intake port 12. The suctioned air is accelerated by action of centrifugal force in a process of circulating among vanes of the compressor wheel 11, and is raised in pressure by the diffuser passage 13 and the compressor scroll passage 14 to be guided into the intake port of the engine.

A discharge port 15 is formed in the turbine housing 4. The discharge port 15 opens on the left of the turbocharger C, and is connected to an exhaust gas purification device (not illustrated). Further, the turbine housing 4 includes a passage 16, and an annular turbine scroll passage 17 that is positioned outside in the radial direction of the turbine wheel 10 from the passage 16. The turbine scroll passage 17 communicates with not only a gas inflow port (not illustrated) through which exhaust gas from an exhaust manifold (not illustrated) of the engine is guided, but also the passage 16. Thus, the exhaust gas is guided into the turbine scroll passage 17 through the gas inflow port (not illustrated), and then is guided into the discharge port 15 through the passage 16 and the turbine wheel 10. The exhaust gas rotates the turbine wheel 10 in this circulation process.

Rotating force of the turbine wheel 10 is transmitted to the compressor wheel 11 through the shaft 9. The rotating force of the compressor wheel 11 increases air pressure as described above, and guides the air into the intake port of the engine. Note that the electric motor 5 secondarily rotates the shaft 9 when the rotating force of the turbine wheel 10 is insufficient, and generates power along with rotation of the shaft 9 when the rotating force by the turbine wheel 10 is sufficiently supplied.

Figure 2:
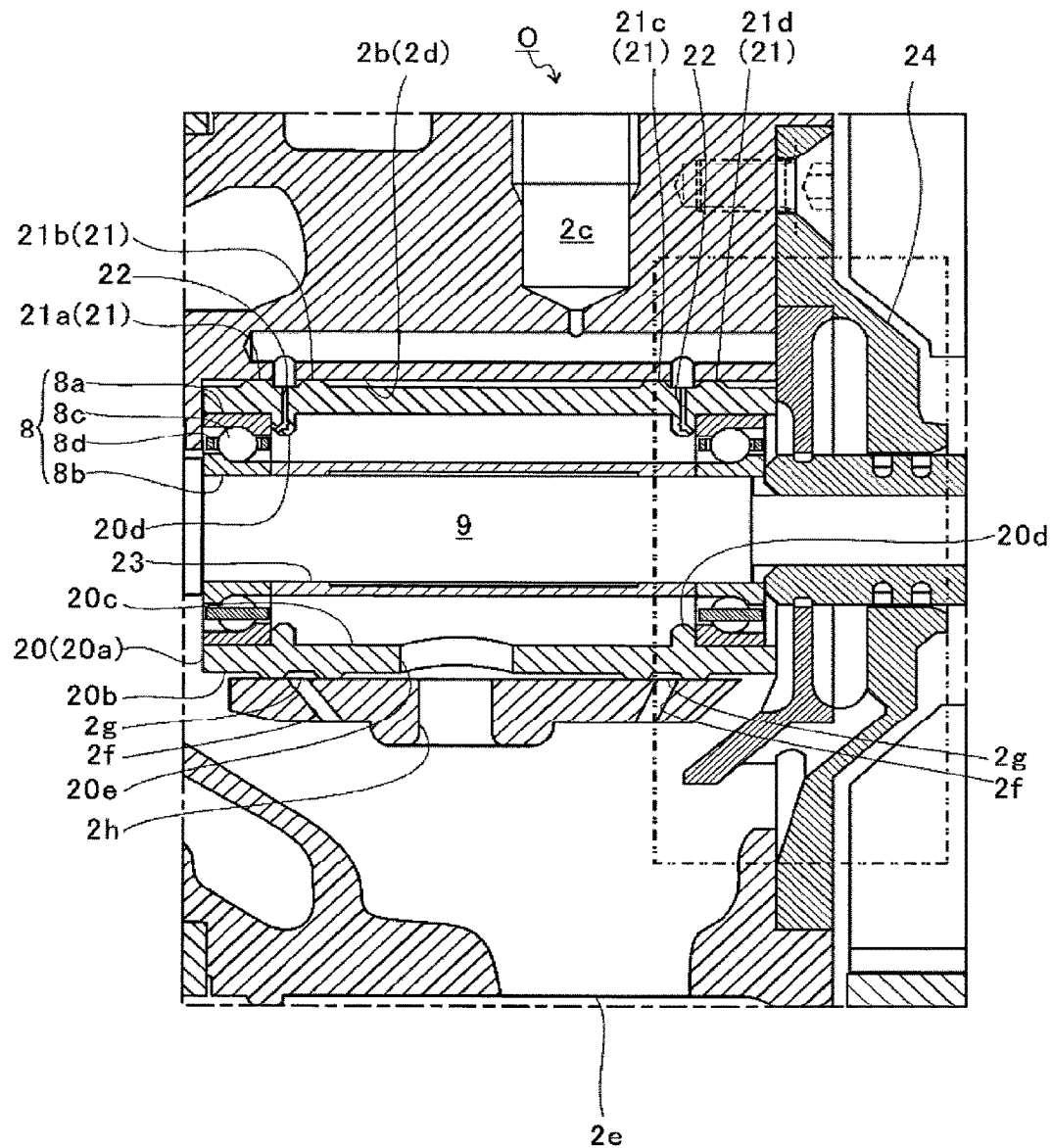
FIG. 2 is a view of an extracted portion surrounded by a dashed line in FIG. 1.

FIG. 2 is a view of an extracted portion surrounded by a dashed line in FIG. 1. As illustrated in FIG. 2, the turbocharger C includes an oil seal structure O. The bearing housing 2 is provided with a supply channel 2c. The supply channel 2c supplies lubricant into the housing hole 2b from the outside of the bearing housing 2. In the housing hole 2b, a vibration absorbing member 20 is housed. The vibration absorbing member 20 includes a cylindrical body 20a. At least one damper 21 is formed on an outer peripheral surface 20b of the body 20a. The damper 21 is positioned outside of the rolling bearing 8 in the radial direction of the shaft 9, and holds lubricant between an inner wall 2d of the housing hole 2b and the damper 21 to absorb vibration of the shaft 9.

Further, the damper 21 includes annular protrusions 21a to 21d that protrude toward outside in the radial direction of the body 20a. A total of the four annular protrusions 21a to 21d are provided two by two on each of both end sides of the body 20a in the axial direction of the shaft 9 (hereinafter referred to simply as the axial direction).

Furthermore, in FIG. 2, the upper side roughly corresponds to a vertically upper side, and the lower side roughly corresponds to a vertically lower side. An oil drain port 2e is formed at a portion positioned vertically below the housing hole 2b in the bearing housing 2. The oil drain port 2e discharges lubricant from the inside of the bearing housing 2 to the outside of the bearing housing 2. As described below, the oil drain port 2e communicates with the outside of the housing 2 from a first oil drain space Sa and a second oil drain space Sb.

An oil drain hole 2f is provided in the bearing housing 2. The oil drain hole 2f penetrates from the oil drain port 2e side to the housing hole 2b. The oil drain hole 2f discharges lubricant from the housing hole 2b to guide it into the oil drain port 2e. In the present embodiment, the oil drain hole 2f is formed on each of both end sides of the housing hole 2b. An opening 2g of the oil drain hole 2f is positioned on the housing hole 2b side, and faces the damper 21.

One of the two oil drain holes 2f is positioned between the annular protrusions 21a and 21b. The other of the two oil drain holes 2f is positioned between the annular protrusions 21c and 21d. Each of the two oil drain holes 2f extends from the opening 2g toward the oil drain port 2e.

The supply channel 2c branches in the bearing housing 2. One of the branching supply channels 2c opens between the annular protrusion 21a and the annular protrusion 21b in the inner wall 2d of the housing hole 2b. The other of the branching supply channels 2c opens between the annular protrusion 21c and the annular protrusion 21d in the inner wall 2d. The body 20a includes two oil guide passages 22 formed in its inside. One of the oil guide passages 22 opens between the annular protrusion 21a and the annular protrusion 21b in the outer peripheral surface 20b of the body 20a. The other of the oil guide passages 22 opens between the annular protrusion 21c and the annular protrusion 21d in the outer peripheral surface 20b. Any one of the oil guide passages 22 communicates with a space in the body 20a to guide lubricant into the rolling bearing 8 housed in the body 20a.

The rolling bearing 8 is housed one by one on each of both end sides in the axial direction of the shaft 9 inside the body 20a. The two rolling bearings 8 are arranged axially separate from each other. Each of the rolling bearings 8 includes an outer ring 8a, and an inner ring 8b smaller than the outer ring 8a in diameter. In addition, each of the rolling bearings 8 includes a plurality of balls 8c that is provided between the outer ring 8a and the inner ring 8b, and is aligned in the circumferential direction of the outer ring 8a (inner ring 8b). The plurality of balls 8c is held by a cage 8d.

The outer ring 8a is held by the vibration absorbing member 20, and the inner ring 8b rotates integrally with the shaft 9. At this time, the balls 8c roll and thereby reduce frictional resistance with the outer ring 8a and the inner ring 8b, thus enabling relative rotation of the outer ring 8a and the inner ring 8b. In this way, the rolling bearing 8 receives a radial load of the shaft 9.

A restriction part 23 is provided between the two inner rings 8b inside the vibration absorbing member 20. The restriction part 23 is a cylindrical (annular) member. The shaft 9 is inserted into the restriction part 23. In addition, both ends of the restriction part 23 in the axial direction of the shaft 9 contact with the respective inner rings 8b. The restriction part 23 restricts the two inner rings 8b from approaching each other while rotating integrally with the inner rings 8b.

Two guide portions 20d are formed on an inner peripheral surface 20c of the vibration absorbing member 20. Each of the guide portions 20d is annularly formed, and protrudes inward in the radial direction of the vibration absorbing member 20. The two rolling bearings 8 are fitted into the body 20a from the respective both end sides of the body 20a until coming into contact with the respective guide portions 20d. Further, each of the oil guide passages 22 extends through the corresponding guide portion 20d to open toward the rolling bearing 8.

A discharge hole 20e is provided between the two guide portions 20d in the body 20a. A part of lubricant is fed to the rolling bearing 8 through the oil guide passage 22, hits against the ball 8c and the like and is bounced off to be discharged from the inside of the body 20a into the housing hole 2b through the discharge hole 20e. An opposing hole 2h is formed in the bearing housing 2. The opposing hole 2h is formed at a position facing the discharge hole 20e. The opposing hole 2h penetrates from the housing hole 2b to the oil drain port 2e side, and guides lubricant in the housing hole 2b into the oil drain port 2e.

On the right (on the electric motor 5 side and the compressor wheel 11 side) in FIG. 2 with respect to the housing hole 2b, a seal plate unit 24 is provided.

Figure 3A:
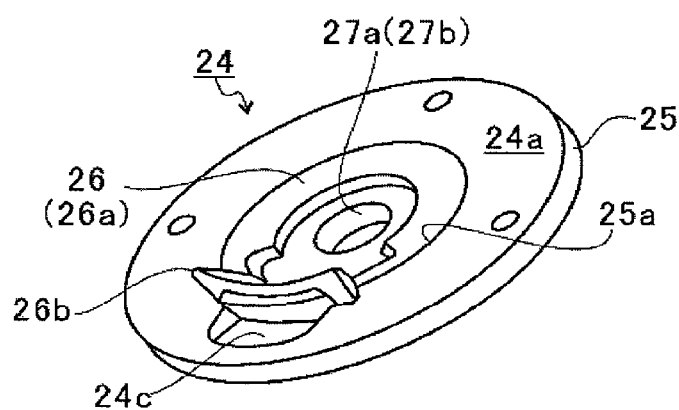
FIGS. 3A to 3C are views to describe a seal plate unit.
Figure 3B:
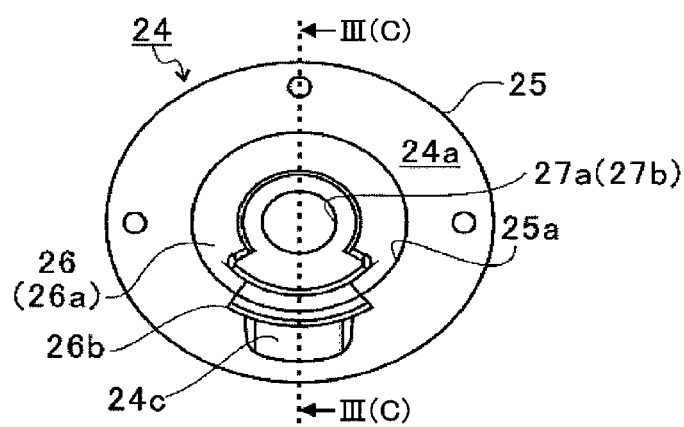
Figure 3C:
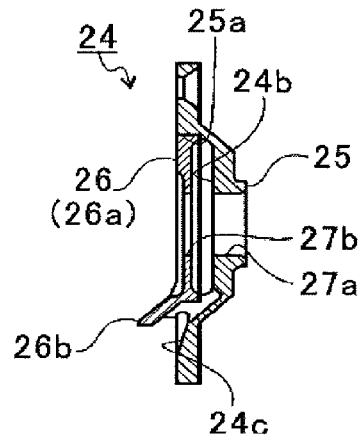

FIGS. 3A to 3C are views to describe the seal plate unit 24. FIG. 3A is a perspective view of the seal plate unit 24. FIG. 3B illustrates an opposing face 24a in front, which faces the housing hole 2b in the seal plate unit 24. FIG. 3C is a sectional view taken along line III(c)-III(c) of FIG. 3B.

As illustrated in FIGS. 3A to 3C, the seal plate unit 24 includes a seal body portion 25, and a partition wall 26. The partition wall 26 includes a plate portion 26a. The seal body portion 25 is provided with a fitting hole 25a formed in a size to be fitted with the plate portion 26a. The plate portion 26a is annularly formed, for example, and is pressed into the fitting hole 25a toward the right in FIG. 3C, for example.

As illustrated in FIG. 3C, an insertion hole 27a through which the shaft 9 is inserted is formed in the seal body portion 25. As with the seal body portion 25, an insertion hole 27b through which the shaft 9 is inserted is also formed in the plate portion 26a. When the plate portion 26a is pressed into the seal body portion 25, the insertion hole 27a of the seal body portion 25 and the insertion hole 27b of the plate portion 26a face each other.

As illustrated in FIG. 3C, an internal space 24b is formed inside the seal plate unit 24. The seal body portion 25 and the plate portion 26a are separated from each other in a penetrating direction of the insertion holes 27a and 27b, inside the seal plate unit 24. This separation thereof forms the internal space 24b. The internal space 24b extends radially outward from the insertion holes 27a and 27b.

As illustrated in FIGS. 3B and 3C, a discharge port 24c opens in a lower portion of the seal plate unit 24. The internal space 24b communicates with the discharge port 24c. A portion in an inner wall forming the discharge port 24c, on the partition wall 26 side, forms a guide portion 26b. The guide portion 26b extends from a portion below the insertion hole 27b in the plate portion 26a in FIG. 3C as a starting point, toward the lower left in FIG. 3C.

Figure 4:
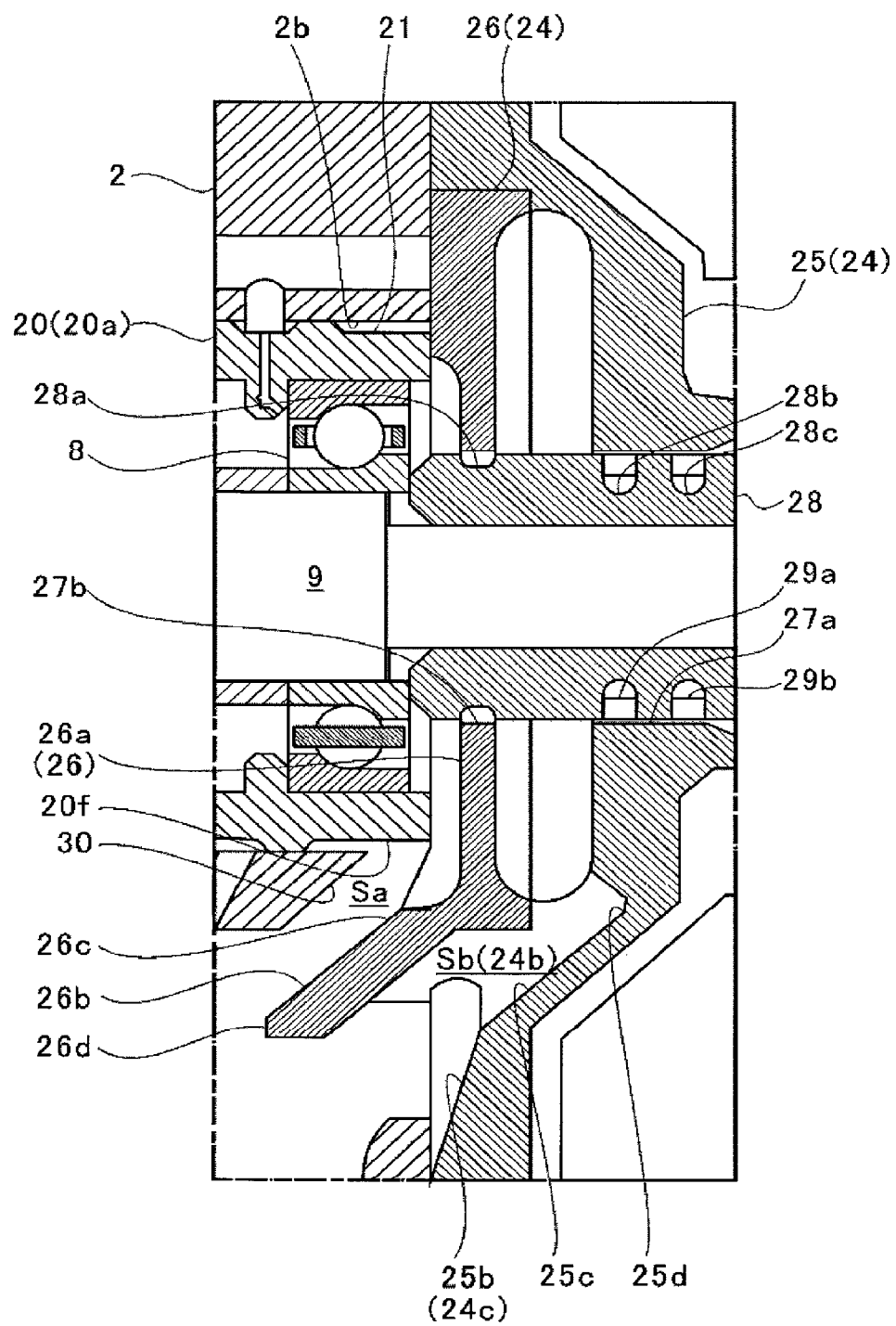
FIG. 4 is a view of an extracted portion surrounded by a two-dot chain line in FIG. 2.

FIG. 4 is a view of an extracted portion surrounded by a two-dot chain line in FIG. 2. As illustrated in FIG. 4, the seal body portion 25 faces the damper 21 through a gap in the axial direction of the shaft 9. Further, the plate portion 26a is positioned between the damper 21 and the seal body portion 25.

The shaft 9 is inserted into the insertion holes 27a and 27b of the seal plate unit 24. Between the shaft 9 and the insertion holes 27a and 27b, an interposing part 28 is provided. The interposing part 28 is formed in a cylindrical (annular) shape, and is fixed to the shaft 9 to rotate integrally with the shaft 9. The interposing part 28 has three annular grooves 28a to 28c formed therein. The annular groove 28a radially faces the insertion hole 27b of the plate portion 26a.

The annular grooves 28b and 28c radially face the insertion hole 27a of the seal body portion 25. Two seal rings 29a and 29b are pressed into an inner peripheral surface of the insertion hole 27a. An outer peripheral surface of each of the seal rings 29a and 29b is in contact with the inner peripheral surface of the insertion hole 27a, and a part of a radially inward portion of each of the seal rings 29a and 29b is inserted into the corresponding one of the annular grooves 28b and 28c.

The partition wall 26 divides a gap (space) formed between the damper 21 (housing hole 2b) and the seal body portion 25 into the first oil drain space Sa positioned on the damper 21 side, and the second oil drain space Sb positioned on the seal body portion 25 side. That is, the first oil drain space Sa is formed by a gap defined by the vibration absorbing member 20, the rolling bearing 8, and the partition wall 26, and the second oil drain space Sb is formed by the internal space 24b of the seal plate unit 24.

A part of lubricant circulates through the damper 21 and the rolling bearing 8, and then flows out from both ends of the housing hole 2b in the axial direction. Lubricant flowing into the compressor wheel 11 side first flows out into the first oil drain space Sa. As illustrated in FIG. 4, an upper side of the first oil drain space Sa is closed by an inner wall forming the first oil drain space Sa. Meanwhile, a lower side of the first oil drain space Sa is opened. Thus, the lubricant guided into the first oil drain space Sa is discharged from the lower side of the first oil drain space Sa while being splashed radially outward by centrifugal force.

In addition, a part of the lubricant flows out into the second oil drain space Sb through a gap between the insertion hole 27b and the interposing part 28 in the radial direction. The annular groove 28a changes a flow of the lubricant from the axial direction to the radial direction. This causes the lubricant to splash toward an inner wall of the second oil drain space Sb. The splashed lubricant flows along the inner wall in its circumferential direction to flow into a lower side of the second oil drain space Sb. As with the first oil drain space Sa, an upper side of the second oil drain space Sb is closed by an inner wall forming the second oil drain space Sb. Meanwhile, a lower side of the second oil drain space Sb is opened. Thus, the lubricant flowing out into the second oil drain space Sb is discharged from the lower side of the second oil drain space Sb. The oil drain port 2e guides the lubricant guided from the first oil drain space Sa and the second oil drain space Sb to the outside of the bearing housing 2.

The lubricant flowing out into the second oil drain space Sb flows along the inner wall of the second oil drain space Sb to flow toward the oil drain port 2e. However, a part of the lubricant may reach the insertion hole 27a of the seal body portion 25. In the present embodiment, the two seal rings 29a and 29b prevent the lubricant from leaking from the insertion hole 27a to the compressor wheel 11 side.

Incidentally, the first oil drain space Sa is closer to the housing hole 2b than the second oil drain space Sb, and tends to be easily affected by merging of lubricants discharged from both of the damper 21 and the rolling bearing 8. When a flow of the lubricant is stagnated due to merging of flows, a stagnated region may expand to occupy an oil passage (the discharge port 24c on the second oil drain space Sb side) after merging of the first oil drain space Sa and the second oil drain space Sb. In this case, oil draining property to lubricant in both of the first oil drain space Sa and the second oil drain space Sb may be deteriorated.

Thus, the guide portion 26b is provided in the partition wall 26. When the seal plate unit 24 is assembled into the bearing housing 2, the guide portion 26b is positioned closer to the oil drain port 2e side (the lower side in FIG. 4) than the shaft 9, in the partition wall 26. The guide portion 26b has its inside in the radial direction of the shaft 9 that is positioned on the first oil drain space Sa side, and its outside in the radial direction of the shaft 9 that is positioned on the second oil drain space Sb side.

That is, the guide portion 26b extends from a lower leading end of the plate portion 26a toward the lower left in FIG. 4. That is, the guide portion 26b extends outward in the radial direction of the shaft 9, and extends toward the oil drain port 2e side in the axial direction of the shaft 9. Thus, a leading end 26d of the guide portion 26b is positioned outward from a base end 26c of the guide portion 26b, positioned on the plate portion 26a side, in the radial direction of the shaft 9, and is positioned on the oil drain port 2e side in the axial direction of the shaft 9.

This causes lubricant discharged from the first oil drain space Sa to be less likely to interfere with lubricant discharged from the discharge port 24c in the second oil drain space Sb. As a result, oil draining property of lubricant from both the first oil drain space Sa and the second oil drain space Sb is improved, so that sealability in each of the seal rings 29a and 29b can be improved.

Further, as compared with the case where the guide portion 26b extends vertically downward, the guide portion 26b extends toward a side closer to the oil drain port 2e side. Thus, lubricant discharged from each of the first oil drain space Sa and the second oil drain space Sb can be easily guided into the oil drain port 2e, so that oil draining property is improved.

Furthermore, the body 20a of the vibration absorbing member 20 is provided with a projecting portion 20f that projects from the housing hole 2b. The projecting portion 20f faces the partition wall 26 in the axial direction of the shaft 9. Then, the guide portion 26b extends to a position facing the projecting portion 20f outside in the radial direction of the shaft 9.

A part of lubricant flowing out along the damper 21 in the axial direction of the shaft 9 is exposed from the housing hole 2b along the projecting portion 20f. At this time, the lubricant spouted radially outward from the projecting portion 20f is guided into the oil drain port 2e by the guide portion 26b, so that oil draining property can be further improved.

Further, a cutout 30 is formed at an end face of the bearing housing 2, at which the housing hole 2b opens. The cutout 30 is formed below the projecting portion 20f in FIG. 4, and extends in the circumferential direction of the shaft 9. Then, the cutout 30 faces the guide portion 26b in the axial direction of the shaft 9 to expand a flow passage section of the first oil drain space Sa formed between the guide portion 26b and the cutout 30.

When the cutout 30 is provided, lubricant can easily flow in the first oil drain space Sa to improve oil draining property in the first oil drain space Sa. This can suppress the amount of lubricant flowing out into the second oil drain space Sb.

Furthermore, an enlarged portion 25b is formed in the seal body portion 25. The enlarged portion 25b is provided at a position facing the guide portion 26b in the axial direction of the shaft 9 in the seal body portion 25. The enlarged portion 25b inclines in a direction in which a flow passage section of the second oil drain space Sb expands toward the oil drain port 2e side (downstream side). Here, the enlarged portion 25b inclines in a direction closer to a vertical direction than to an inner wall surface 25c on an upstream side.

When the enlarged portion 25b is provided, the flow passage section of the second oil drain space Sb increases toward the oil drain port 2e side to allow lubricant to easily flow in the second oil drain space Sb, and thus oil draining property can be further improved.

Further, a plate groove 25d recessed in the axial direction of the shaft 9 is formed at the inner wall surface 25c facing the second oil drain space Sb in the seal body portion 25. That is, the plate groove 25d is recessed in a direction separating from the partition wall 26.

When the plate groove 25d is provided, a large volume of the second oil drain space Sb on the oil drain port 2e side can be secured, and thus oil draining property can be further improved as with the case of providing the enlarged portion 25b described above.

In the present embodiment, the rolling bearing 8 is provided as a bearing unit. However, a bearing other than the rolling bearing 8 may be used as the bearing unit. For example, when a semi-floating bearing in which movement in a rotation direction is restricted is provided, a bearing face formed in an inner peripheral surface of the semi-floating bearing corresponds to a bearing unit that receives a radial load, and thus the damper 21 may be formed in an outer peripheral surface of the semi-floating bearing. Furthermore, in this case, the semi-floating bearing corresponds to the vibration absorbing member 20. That is, while there has been described the case where the bearing unit (rolling bearing 8) and the vibration absorbing member 20 are formed separately from each other in the embodiment described above, the bearing unit (rolling bearing 8) and the vibration absorbing member 20 may be formed integrally with each other.

In the present embodiment, the turbocharger C includes the electric motor 5. However, the electric motor 5 may be eliminated depending on specifications of a turbocharger. However, when the electric motor 5 is provided, the turbocharger C tends to increase in size in the axial direction of the shaft 9. To prevent further increase in size, improvement in oil draining property as described above enables sufficient sealability to be secured even if a space to secure the first oil drain space Sa and the second oil drain space Sb is limited.

In the present embodiment, the oil seal structure O is provided at a position on the compressor wheel 11 side from the housing hole 2b in the turbocharger C. However, the oil seal structure O may be provided at a position on the turbine wheel 10 side from the housing hole 2b. In addition, a device provided with the oil seal structure O is not limited to the turbocharger C, and may be another rotary machine provided with the damper 21.

In the present embodiment, the projecting portion 20f is provided in the body 20a of the vibration absorbing member 20, and the guide portion 26b extends to a position facing the projecting portion 20f outside in the radial direction of the shaft 9. However, the projecting portion 20f may be eliminated, and the guide portion 26b may not need to extend outside in the radial direction of the projecting portion 20f.

In the present embodiment, the damper 21 includes the annular protrusions 21a to 21d each of which protrudes radially outward from the body 20a of the vibration absorbing member 20, and the opening 2g of the oil drain hole 2f on the housing hole 2b side faces the damper 21. However, the damper 21 may not include the annular protrusions 21a to 21d each of which protrudes radially outward from the body 20a of the vibration absorbing member 20. The opening 2g of the oil drain hole 2f on the housing hole 2b side may not face the damper 21. However, when the damper 21 includes the annular protrusions 21a to 21d each of which protrudes radially outward from the body 20a of the vibration absorbing member 20, and the opening 2g of the oil drain hole 2f on the housing hole 2b side faces the damper 21, lubricant used in the damper 21 can be efficiently discharged from the oil drain hole 2f to enable reduction in the amount of lubricant flowing toward the seal plate unit 24 side.

In the present embodiment, the damper 21 includes the plurality of annular protrusions 21a to 21d separated from each other in the axial direction of the shaft 9, the opening 2g of the oil drain hole 2f is positioned at any of spaces between the plurality of annular protrusions 21a to 21d, and the oil drain hole 2f extends from its opening 2g toward the oil drain port 2e. However, the damper 21 may not include the plurality of annular protrusions 21a to 21d separated from each other in the axial direction of the shaft 9. In addition, the opening 2g of the oil drain hole 2f may not be positioned at any of spaces between the plurality of annular protrusions 21a to 21d. Further, the oil drain hole 2f may not extend from its opening 2g toward the oil drain port 2e. However, by the structure in which the damper 21 includes the plurality of annular protrusions 21a to 21d separated from each other in the axial direction of the shaft 9, the opening 2g of the oil drain hole 2f is positioned at any of spaces between the plurality of annular protrusions 21a to 21d, and the oil drain hole 2f extends from its opening 2g toward the oil drain port 2e, it is possible to efficiently guide lubricant into the oil drain port 2e while maintaining suppression of vibration by the damper 21.

In the present embodiment, the internal space 24b of the seal plate unit 24 is formed by a combination of the seal body portion 25 and the partition wall 26 that is a different member from the seal body portion 25. However, the internal space 24b may be formed of a member acquired by integrally molding the seal body portion 25 and the partition wall 26.

In the present embodiment, the enlarged portion 25b is formed in the seal body portion 25. However, the enlarged portion 25b may be eliminated.

In the present embodiment, the cutout 30 is formed at the end face of the bearing housing 2. However, the cutout 30 may be eliminated.

In the present embodiment, the plate groove 25d is formed in the seal body portion 25. However, the plate groove 25d may be eliminated.

The present disclosure is not limited to the embodiment described above. A person skilled in the art can conceive various variations or modifications in the category described in the scope of claims. They naturally fall within the technical scope of the present disclosure.

What is claimed is:

1. An oil seal structure comprising:
   a housing provided with a housing hole;
   a bearing unit for a shaft, being provided in the housing hole;
   at least one damper positioned outside the bearing unit in a radial direction of the shaft, configured to absorb vibration of the shaft while holding lubricant between an inner wall of the housing hole and the damper;
   a seal body portion facing the damper through a gap in an axial direction of the shaft;
   a partition wall dividing the gap formed between the damper and the seal body portion into a first oil drain space on the damper side and a second oil drain space on the seal body portion side;

an oil drain port formed in the housing, configured to communicate with an outside of the housing from the first oil drain space and the second oil drain space; and a guide portion provided in the partition wall to be closer to the oil drain port than the shaft and having an inner side in the radial direction of the shaft to be positioned on the first oil drain space side and an outer side in the radial direction of the shaft to be positioned on the second oil drain space side, wherein the seal body portion includes an enlarged portion at a position facing the guide portion in the axial direction of the shaft, in the seal body portion, the enlarged portion inclining in a direction in which a passage cross-section of the second oil drain space expands toward the oil drain port side.

2. The oil seal structure according to claim 1, further comprising:

a vibration absorbing member including a body to be housed in the housing hole and having the damper formed on an outer peripheral surface of the body, wherein the body of the vibration absorbing member is provided with a projecting portion that faces the partition wall in the axial direction of the shaft and projects from the housing hole, and the guide portion extends to a position facing the projecting portion outside in the radial direction of the shaft.

3. The oil seal structure according to claim 2, wherein a plate groove recessed in the axial direction of the shaft is formed on an inner wall surface facing the second oil drain space in the seal body portion.

4. The oil seal structure according to claim 2, wherein the damper includes an annular protrusion protruding radially outward from the body of the vibration absorbing member, in the housing, an oil drain hole is formed that penetrates from the oil drain port side to the housing hole, and an opening of the oil drain hole on the housing hole side faces the damper.

5. The oil seal structure according to claim 4, wherein a plate groove recessed in the axial direction of the shaft is formed on an inner wall surface facing the second oil drain space in the seal body portion.

6. The oil seal structure according to claim 4, wherein the at least one damper includes a plurality of the annular protrusions separated from each other in the axial direction of the shaft, and the oil drain hole has the opening positioned among the plurality of the annular protrusions and extends from the opening toward the oil drain port.

7. The oil seal structure according to claim 6, wherein a plate groove recessed in the axial direction of the shaft is formed on an inner wall surface facing the second oil drain space in the seal body portion.

8. The oil seal structure according to claim 1, wherein a cutout is formed at a portion facing the guide portion in the axial direction of the shaft, on an end face of the housing at which the housing hole is opened, the cutout expanding a passage cross-section of the first oil drain space.

9. The oil seal structure according to claim 8, wherein a plate groove recessed in the axial direction of the shaft is formed on an inner wall surface facing the second oil drain space in the seal body portion.

10. The oil seal structure according to claim 1, wherein a plate groove recessed in the axial direction of the shaft is formed on an inner wall surface facing the second oil drain space in the seal body portion.

11. A turbocharger comprising the oil seal structure according to claim 1.

* * * * *